(12) United States Patent
Neumann et al.

(10) Patent No.: US 6,926,329 B2
(45) Date of Patent: Aug. 9, 2005

(54) COVERING PIECE WITH A SWING-OUT SCREEN

(75) Inventors: Michael Neumann, Leverkusen (DE); Christoph Bellenberg, Cologne (DE); Philippe Holland, Johcherey (FR)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 10/497,983
(22) PCT Filed: Dec. 3, 2002
(86) PCT No.: PCT/EP02/13648
§ 371 (c)(1), (2), (4) Date: Jun. 7, 2004
(87) PCT Pub. No.: WO03/047912
PCT Pub. Date: Jun. 12, 2003

(65) Prior Publication Data
US 2005/0006918 A1 Jan. 13, 2005

(30) Foreign Application Priority Data
Dec. 6, 2001 (DE) .......................... 101 59 919

(51) Int. Cl.⁷ .............................................. B60R 11/02
(52) U.S. Cl. ................... 296/24.34; 296/37.8
(58) Field of Search ........................ 296/24.34, 37.5, 296/37.7, 37.12, 1.07, 37.8; 248/917; 312/7.2

(56) References Cited

U.S. PATENT DOCUMENTS

| 5,207,471 | A | | 5/1993 | Mutschler et al. | |
|---|---|---|---|---|---|
| 6,246,449 | B1 | * | 6/2001 | Rosen | 296/37.7 |
| 6,278,676 | B1 | | 8/2001 | Anderson et al. | |
| 6,494,527 | B1 | * | 12/2002 | Bischoff | 296/24.34 |
| 6,663,155 | B1 | * | 12/2003 | Malone et al. | 296/37.8 |
| 6,719,343 | B2 | * | 4/2004 | Emerling et al. | 296/37.8 |
| 6,746,065 | B1 | * | 6/2004 | Chan | 296/37.8 |

FOREIGN PATENT DOCUMENTS

| DE | 3719105 A1 | 12/1988 |
|---|---|---|
| DE | 196 09-408 A1 | 9/1997 |
| DE | 197 00 515 A1 | 7/1998 |

(Continued)

OTHER PUBLICATIONS

International Search Report; International Application No. PCT/EP 02/13648; dated Jun. 2, 2003; 3 pgs.
International Search Report for WO 03/051665, International Application No. PCT/EP 02/14199 mailed Mar. 31, 2003, 3 pages.
International Search Report for WO 03/047912; International Application No. PCT/EP 02/13648; mailed Feb. 6, 2003; 3 pages.

Primary Examiner—Jason Morrow
(74) Attorney, Agent, or Firm—Foley & Lardner LLP

(57) ABSTRACT

A trim panel (1) of a vehicle interior, in particular an instrument panel or central console, has a viewing screen (6) which can be swung up from a non-functional position into a functional position. According to the invention, the trim panel (1) is provided with at least one guide element (3), (12), (13) which is coupled, on the one hand, to the trim panel (1) and, on the other hand, to the viewing screen (6) and the axes of rotation of which run essentially parallel to one another. It is preferable for two guide elements (12), (13) to be provided which are coupled in each case to the trim panel (1), on the one hand, and to the viewing screen (6), on the other hand, and the axes of rotation of which run parallel to one another.

20 Claims, 5 Drawing Sheets

FOREIGN PATENT DOCUMENTS

| | | |
|---|---|---|
| DE | 19754224 A1 | 6/1999 |
| DE | 19931154 A1 | 1/2001 |
| DE | 199 38 690 A1 | 2/2001 |
| DE | 10161663 A1 | 6/2003 |
| FR | 2805225 B1 | 8/2001 |
| JP | 62076935 | 10/1988 |
| JP | 63242751 | 10/1988 |
| JP | 2249734 | 10/1990 |
| JP | 04095543 | 3/1992 |
| JP | 02278343 | 5/1992 |
| JP | 4154452 | 5/1992 |
| JP | 7195962 | 8/1995 |
| JP | 06156635 | 1/1996 |
| JP | 8009291 | 1/1996 |
| JP | 2000143986 | 11/2001 |
| JP | 2001322503 | 11/2001 |
| WO | WO 99/65734 A1 | 12/1999 |
| WO | WO 03/047912 A2 | 6/2003 |

\* cited by examiner

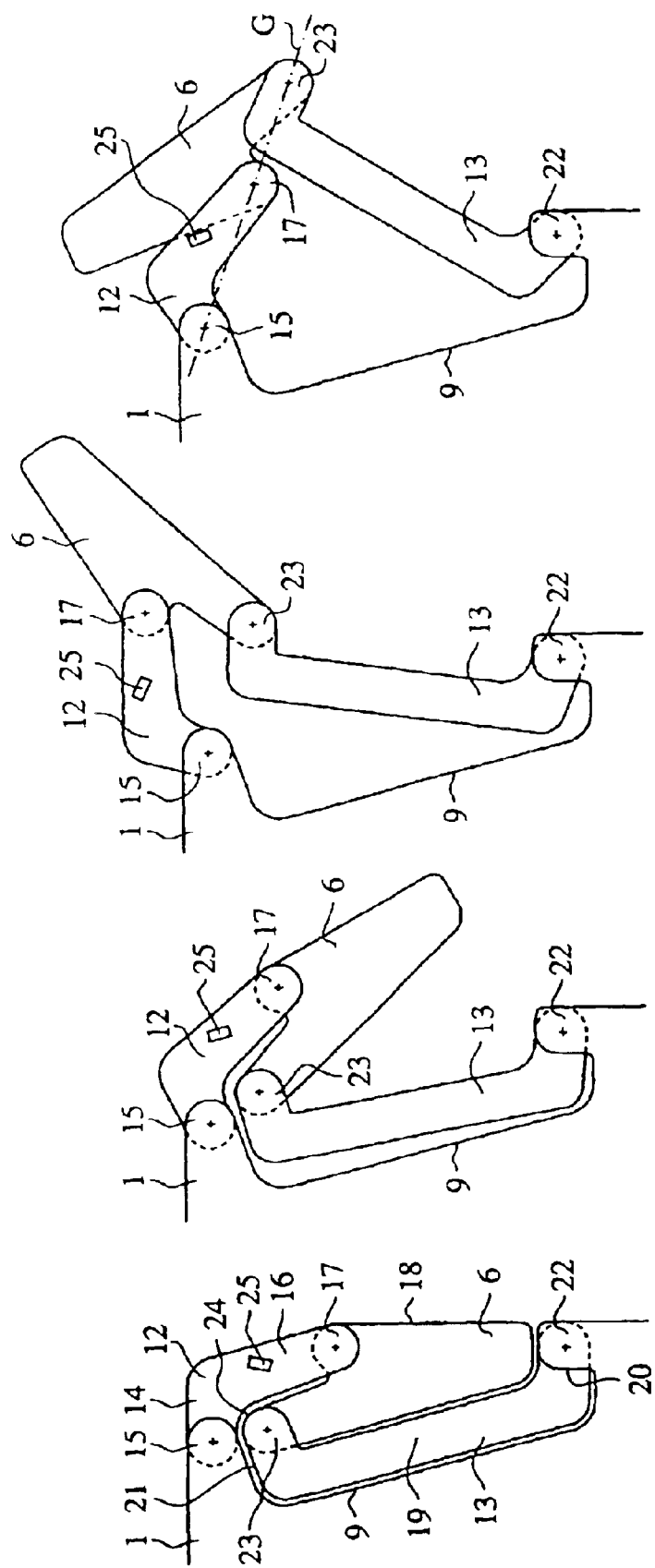

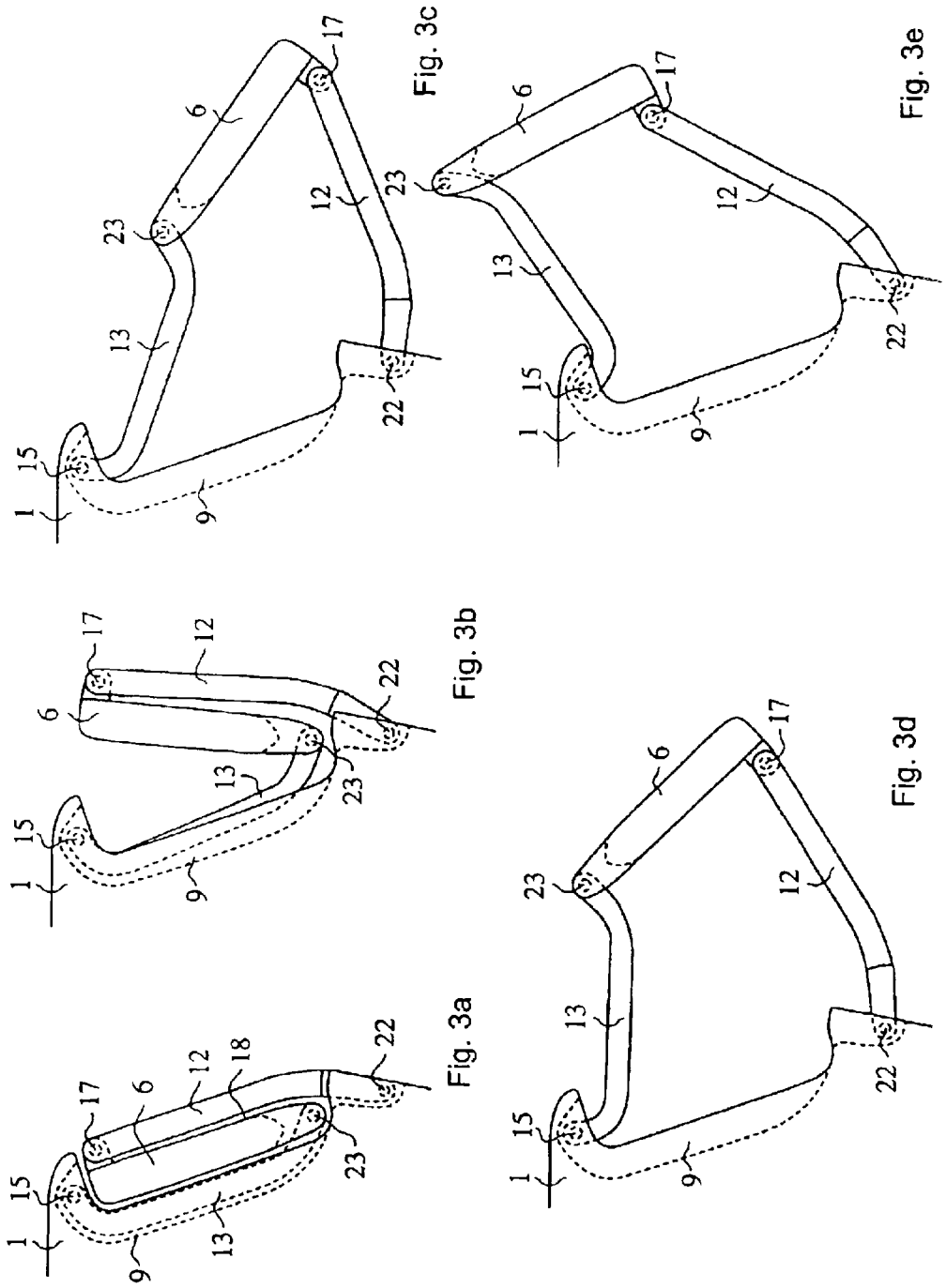

COVERING PIECE WITH A SWING-OUT SCREEN

CROSS-REFERENCE TO RELATED PATENT APPLICATIONS

The present invention claims priority International Application No. PCT/EP02/13648 having an International Filing Date of Dec. 3, 2002, the full disclosure of which is hereby incorporated herein by reference.

BACKGROUND

The invention relates to a trim panel of a vehicle interior, in particular instrument panel or central console, having a viewing screen which can be swung up from a non-functional position into a functional position.

A trim panel of the generic type is disclosed in the laid-open specification DE 199 38 690 A1. The instrument panel described there is provided with a receiving compartment for a monitor which can be transferred by means of a folding and displacement mechanism from a non-functional position within the receiving compartment into a functional position, in which the monitor can be seen from the vehicle interior. The folding and displacement mechanism is equipped with slotted-guide mechanisms which are spaced apart from one another and in which the viewing screen, after a cover is opened, slides from an essentially horizontal position into the approximately vertical functional position.

This design is disadvantageous in one respect, since the cover is designed as a separate component and therefore increases the outlay on construction. In particular, a parallel arrangement of a plurality of slotted-guide mechanisms has a tendency to jam if the guide rails deviate even slightly in position or if the monitor tilts even slightly.

The laid-open specification DE 197 00 515 A1 discloses a dashboard onto which an output unit for information which can be displayed visually can be placed. The output unit, which rests flat on the dashboard, is, in a manner similar to a conventional laptop, provided with a monitor which can be pivoted about a horizontal axis of rotation (Y-axis of the vehicle) running transversely with respect to the direction of travel. In this case, the output unit is not integrated in the dashboard, but rather constitutes a not very elegant additional component which is complicated to secure.

The publication DE 196 09 408 A1 furthermore describes a dashboard having a display zone, for example a projection surface, which is installed in a fixed position in the dashboard. Deformation of membrane-like shutters, which butt against each other in the region of the display zone, enable the latter either to be completely concealed or made visible from the driving seat. For this purpose, the ends of the shutters are connected via rod-like connecting elements to a rocker whose rotation enables the shutters to be adjusted. However, this design is suitable only for comparatively small-format display zones or presupposes the presence of extensive areas in the dashboard in which the shutters can be arranged. Use in trim panels of less extent in terms of area, for example central consoles, is therefore virtually impossible.

SUMMARY

The invention is based on the object of providing a trim panel from which a monitor can be swung up with low actuating forces and little outlay on construction and which can furthermore be designed to be compact and elegant.

The object is achieved according to the invention by a generic trim panel having at least one guide element which is coupled, on the one hand, to the trim panel and, on the other hand, to the viewing screen and the axis of rotation of which run essentially parallel to one another.

This design enables the viewing screen to be pivoted from the functional position, by means of a semi-rotation, to behind the guide element protruding from the trim panel and to be shifted together with the latter toward the trim panel. The compact unit produced in this manner can be integrated into the contour of the trim and, furthermore, the rotary joints do not have a tendency to inadvertently jam.

According to one variant of the invention, the guide element in the functional position of the viewing screen can be brought into the same position resting on the trim panel as in the non-functional position of the viewing screen, with the result that it can be locked on the trim panel in both positions. Only the viewing-screen-side joint of the guide element therefore has to be provided with an additional fixing device, for example a friction coupling.

By contrast, according to another advantageous design, the guide element in the functional position of the viewing screen can be fixed in a position deviating from the non-functional position. In this case, although both the trim-panel-side and viewing-screen-side joints of the guide element have to be provided with fixing devices, the position of the viewing screen can be adapted more flexibly to the requirements of the vehicle occupants.

According to one variant of the invention which is to be particularly preferred, at least two guide elements are provided which are coupled in each case to the trim panel, on the one hand, and to the viewing screen, on the other hand, and the axes of rotation of which run parallel to one another. The viewing screen is therefore guided in its pivoting movement by a four-bar frame and is held particularly securely in its functional position. In this case, according to one advantageous design, the distance between the trim-panel-side axis of rotation of the first guide element and the viewing-screen-side axis of rotation of the second guide element and between the trim-panel-side axis of rotation of the second guide element and the viewing-screen-side axis of rotation of the first guide element increases when the viewing screen is swung up from the non-functional position into the functional position.

A kinematic configuration is particularly to be preferred, in which a guide element, when the viewing screen is shifted from the non-functional position into the functional position, executes a rotational movement directed exclusively in one direction of rotation. A manual or mechanical rotary drive which can be of simple design can act on this guide element and, for the transfer into the functional position, rotates in the one direction, and, in contrast, for the transfer into the non-functional position, rotates in the other direction and in the process forceably pivots the viewing screen into the desired position. By contrast, the other guide element can be coupled in such a manner that it changes its direction of rotation when the viewing screen is swung out.

In all of the embodiments, it is advantageous if one guide element entirely or partially engages around the viewing screen from the outside in the non-functional position. This firstly protects the viewing screen from mechanical damage and secondly enables the relevant guide element to be of rounded and padded design in order to increase the vehicle occupants' safety. For this purpose, the guide element engaging around the viewing screen on the outside is preferably of sheet-like design and essentially conceals the rear side of said viewing screen in the non-functional position, the viewing screen in the non-functional position advantageously being arranged in a recess of the trim panel. In this case, the other guide element can take up a position between the viewing screen and the trim panel.

In principle, the axes of rotation of the guide elements may run in any desired direction as long as they are orientated parallel to one another. If, however, the trim panel is arranged in the interior of a motor vehicle, an essentially horizontal orientation is advantageous for visual and functional reasons and also with regard to the available constructional space.

BRIEF DESCRIPTION OF THE DRAWINGS

The figures schematically illustrate different variants of the invention by way of example.

FIG. 2 shows the joint mechanism of another trim panel in corresponding phases, in a side view, FIG. 3 shows a corresponding view of a further variant according to the invention.

DETAILED DESCRIPTION OF THE PREFERRED EMBODIMENTS

Figure 1A:
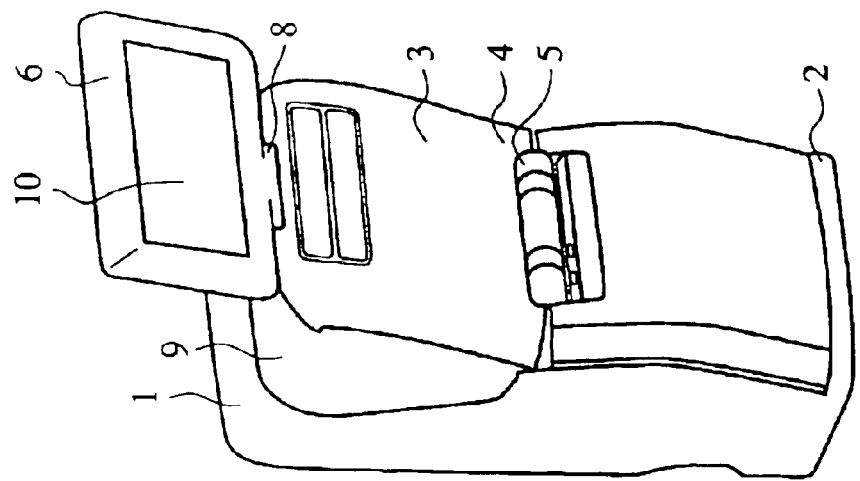
FIG. 1 shows a first trim panel according to the invention in various phases of the movement from the non-functional position into the functional position of the viewing screen, in a perspective view.
Figure 1B:
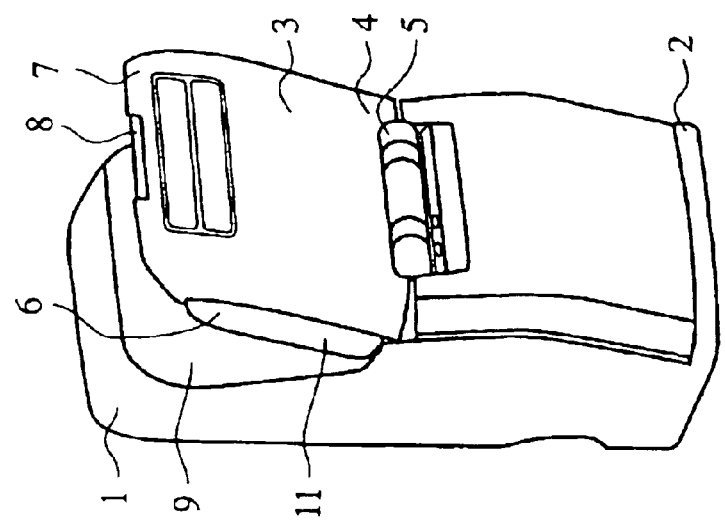

The trim panel 1 which is illustrated in FIG. 1 and is designed as a central console of a passenger vehicle is equipped on its vertical end surface 2, which faces the vehicle rear, with a sheet-like guide element 3 which is connected at its lower edge 4 to the trim panel 1 via a first joint 5 arranged approximately centrally in the end surface 2. A viewing screen 6 is connected pivotably on an edge side by means of a further joint 8, which is situated on the upper edge 7 of the guide element 3, to the guide element 3 and therefore indirectly also to the trim panel 1.

The axes of rotation of the joints 5, 8 run spaced apart from one another and parallel in the horizontal direction transversely with respect to the direction of travel, i.e. in the direction of the vehicle axis which is usually designated as the Y-axis.

In the non-functional position, the viewing screen 6, as can be seen from FIG. 1a, is embedded between the guide element 3 and the trim panel 1 in a recess 9 let into the latter. The display 10 of the viewing screen 6, which is completely concealed on the rear side by the guide element 3, points in the direction of travel and cannot be seen by the vehicle occupants. In this case, the trim panel 1, those side surfaces 11 of the viewing screen which end flush with the trim panel 1 and the guide element 3 form a compact constructional unit.

Figure 1C:
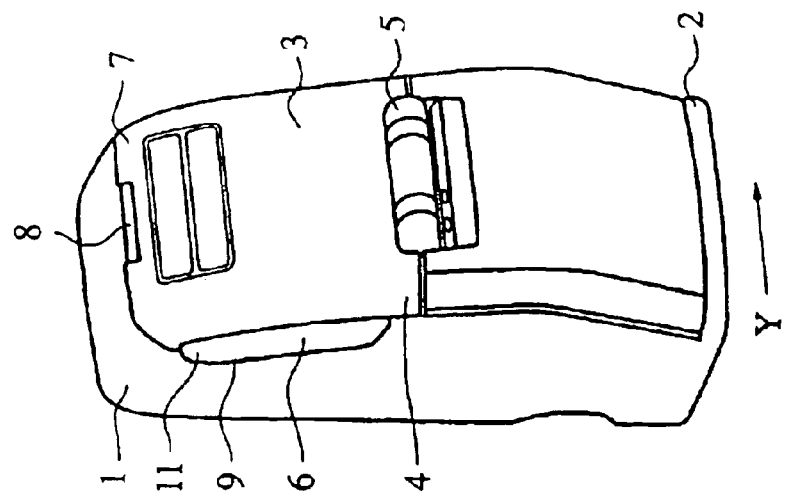
Figure 1F:
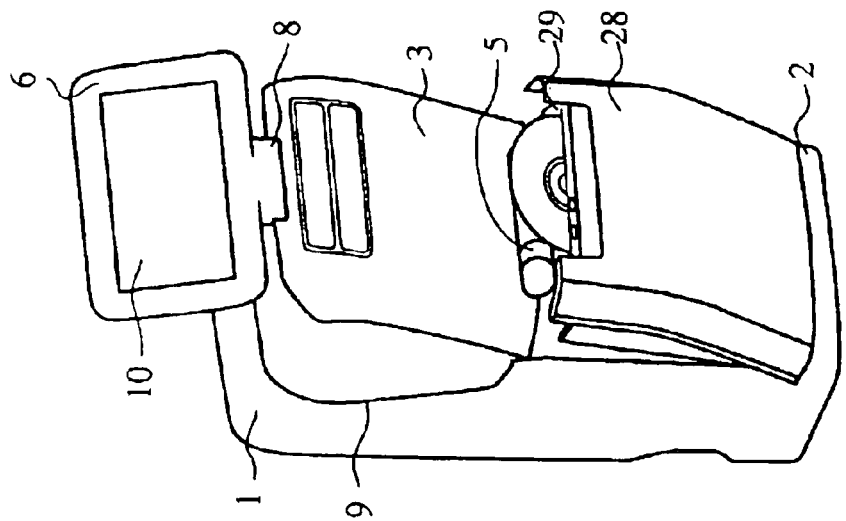
Figure 1E:
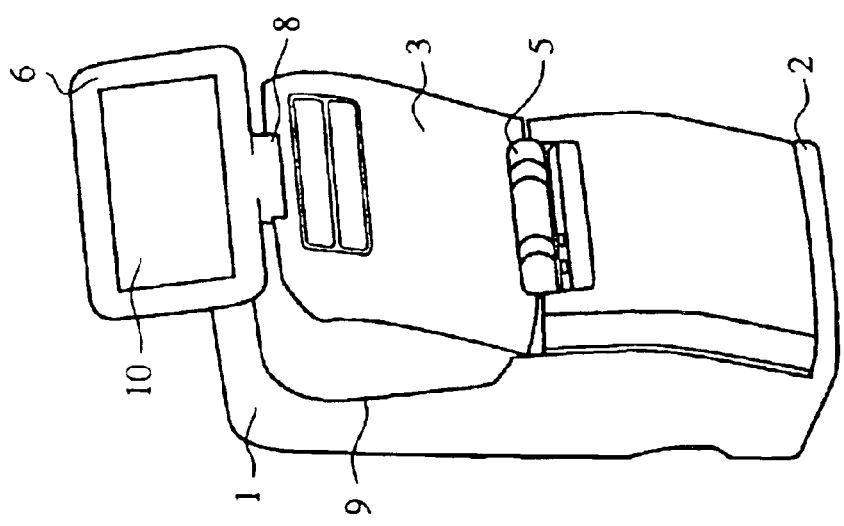
Figure 1D:
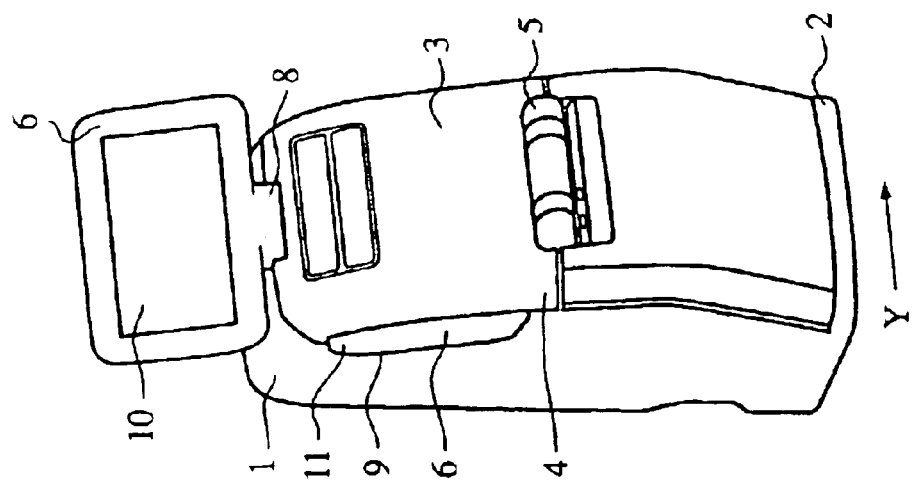

During the transfer of the viewing screen into the functional position, first of all the guide element 3 is folded rearward (FIG. 1b) about the joint 5 arranged on the trim panel 1 until the viewing screen 6 can be pivoted upward through an angle of approximately 180° in the upper joint 8 into an upright position which can be seen by the rear vehicle occupants (FIG. 1c). The guide element can subsequently be folded back in the direction of the trim panel 1 where it can be locked, in which case the viewing screen 6 takes up its functional position, which can be adapted in the joint 8 by means of rotation (FIG. 1d). As an alternative, the guide element, as illustrated in FIG. 1e, can be held in a position protruding from the trim panel 1 by the lower joint 5 being fixed. The fixing is preferably of flexible design both in the upper joint 8 and in the lower joint 5, for example by means of friction couplings integrated in the joints 5, 8.

That region of the end surface 2 of the trim panel 1 which is situated below the guide part 3 can be used in an ergonomically favorable manner for the arrangement of control and functional elements. In the exemplary embodiment, a flap 28 is provided for this purpose, the flap being mounted in the lower region of the trim panel 1 in a manner such that it can rotate bout the Y-axis and, when it is pivoted forward, a DVD layer 29 becoming accessible.

FIG. 2 shows the joint mechanism of another trim panel 1 according to the invention, in which the viewing screen 6 is held in an articulated manner by two guide elements 12, 13. The first guide element 12, which is the outer one in the non-functional position (FIG. 2a) and is angled in side view, is connected to the trim panel 1 by means of a joint 15, which is situated on its upper, horizontal limb 14, and is connected by means of its vertically downwardly protruding limb 16 via a joint 17 to the viewing screen. In this case, the joint 17 is fitted approximately centrally on the rear side 18 of the viewing screen 6, which side is partially visible in the non-functional position, and is covered by the angled, first guide element 12.

The second guide element 13 is of U-shaped design with a wide base 19 and short limbs 20, 21. The end sides of the latter are provided with further joints 22, 23 of which, in the non-functional position illustrated, the lower joint 22 is fitted approximately centrally on the end surface 2 of the trim panel 1 whereas the upper joint 23 is connected to the edge 24 of the viewing screen 6 which is the upper, horizontal one in the non-functional position illustrated.

The axes of rotation of the joints 15, 17, 22 and 23 run spaced apart from one another and parallel both on the trim-panel side and on the viewing-screen side.

By means of the arrangement in a recess 9, the guide elements 12, 13 and the viewing screen 6, which are orientated approximately parallel to one another, end flush with the contour of the trim panel 1 on all sides in the non-functional position.

During the transfer of the viewing screen 6 into the functional position (FIG. 2d), the second guide element 19 is pivoted rearward about the joint 22 exclusively in one direction, i.e. only in the clockwise direction in the selected sideview. In the process, firstly the distance between the axis of rotation of the trim-panel-side joint 15 of the first guide element 12 and the axis of rotation of the viewing-screen-side joint 23 of the second guide element 13 and secondly the distance between the axis of rotation of the trim-panel-side joint 22 of the second guide element 13 and the axis of rotation of the viewing-screen-side joint 17 of the first guide element 12 increase.

The viewing screen 6 is rotated through somewhat more than 180° in the opposite direction, in which case the first guide element 12 first of all pivots about the trim-panel-side joint 15 in the same direction as the viewing screen 6 (FIGS. 2b, 2c), but then changes its direction of rotation and again pivots in the same direction as the second guide element. A manual or mechanical drive of the joint mechanism therefore preferably acts on the joint 22, since only the latter retains the same direction of rotation over the entire sequence of movement. In addition, there is sufficient space in the trim panel 1 for the accommodation of the drive elements, in contrast to the surroundings of the joints 17 and 24 which likewise rotate unidirectionally and are fitted on the viewing screen 6.

The viewing screen 6 is supported in the functional position on a stop 25 of the first guide element 12, with whose limb 16 it forms an acute angle in the joint 17, and does not need to be fixed separately. In this case, the limb 16 of the first guide element and the base 19 of the base element are orientated approximately at right angles to each other, the axes of rotation of the joints 15, 17 and 23 running approximately along a straight line G. The direction of rotation of the first guide element 12, which changes over the course of the viewing screen 6 being pivoted out, is essential for the automatic securing of the position of the viewing screen 6 in the functional position, since, in this position, a stable equilibrium is produced again in the four-bar mechanism by the viewing screen 6 resting on the stop 25.

Figure 4:
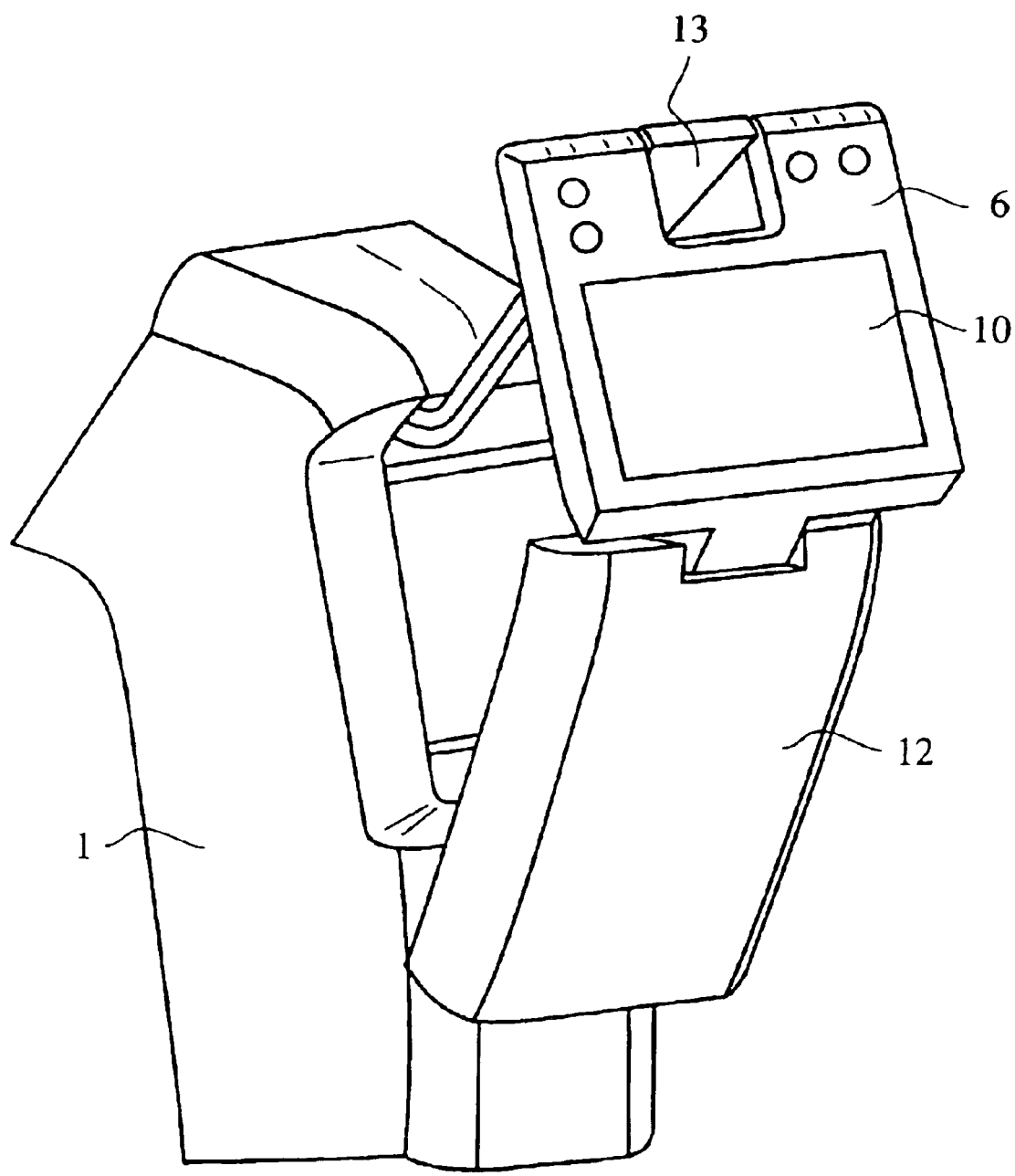
FIG. 4 shows a trim panel with a joint mechanism according to FIG. 3 in the functional position of the viewing screen, in a perspective illustration.

A final variant of the invention is illustrated in FIGS. 3 and 4. Departing from the design shown in FIG. 2, the viewing-screen-side joints 17 and 23 of the two guide elements 12 and 13 are arranged in each case on the horizontal edges 26, 27 of the viewing screen 6. This enables the viewing screen 6 to be essentially concealed in the non-functional position by means of the outer guide element 12 which is of sheet-like design and is coupled to the upper edge 26 of the viewing screen and approximately centrally to the end surface 2 of the trim panel 1. By contrast, the guide element 13 which is coupled in the upper region of the trim panel 1 and on the lower edge of the viewing screen 6 is situated in this case in the recess 9 between the pivoted-in viewing screen 6 and the trim panel 1. Since neither the guide element 12 nor the guide element 13 change the direction of rotation during the course of the viewing screen being pivoted out into the functional position, fixing devices have to be provided in one or more of the joints 15, 17, 2, 23. As an alternative, it is, of course, possible for a fixing device also to act from the outside on the moveable parts of the joint mechanism or to act in some other manner between them.

The trim panel according to the invention can be designed, in particular, as a dashboard or central console of a motor vehicle. However, other embodiments are also conceivable, for example the rear backrest or head-restraint trim of vehicle seats.

REFERENCE NUMBERS

1 Trim panel
2 End side
3 Guide element
4 Edge
5 Joint
6 Viewing screen
7 Edge
8 Joint
9 Recess
10 Display
11 Side surface
12, 13 Guide element
14 Limb
15 Joint
16 Limb
17 Joint
18 Rear side
19 Base
20, 21 Limb
22, 23 Joint.
24 Edge
25 Stop
26, 27 Edge
28 Flap
29 DVD player

What is claimed is:

1. A display system for a vehicle comprising:
    a viewing screen configured to rotate between a non-functional position into a functional position;
    a first guide element rotatable about a first axis and rotatably coupled to the viewing screen at a second axis;
    a second guide element rotatable about a third axis and rotatably coupled to the viewing screen at a fourth axis;
    wherein the first axis, second axis, third axis, and fourth axis are substantially parallel to each other.

2. The display system of claim 1 wherein the first guide element in the functional position of the viewing screen can be brought into the same position as in the non-functional position of the viewing screen.

3. The display system of claim 1 wherein the first guide element in the functional position of the viewing screen can be fixed in a position deviating from the non-functional position.

4. The display system of claim 1 wherein the distance between the first axis and the fourth axis and between the third axis and the second axis are enlarged when the viewing screen is rotated from the non-functional position into the functional position.

5. The display system of claim 1 wherein the first guide element has a rotational movement directed exclusively in one direction of rotation about the first axis when the viewing screen is shifted from the non-functional position to the functional position.

6. The display system of claim 5 further comprising means for rotating the guide element when the viewing screen is shifted from the non-functional position into the functional position and executes a rotational movement directed in one direction of rotation.

7. The display system of claim 6 wherein the means for rotating the guide element is manual and is located on the first guide element.

8. The display system of one of claim 1 wherein the first guide element changes its direction of rotation about the first axis when the viewing screen is shifted from the non-functional position into the functional position.

9. The display system of one of claim 8 wherein the second guide element is arranged, in the non-functional position of the viewing screen, between the viewing screen and the vehicle.

10. The display system of claim 1 wherein the first guide element at least partially engages around the viewing screen from the outside in the non-functional position.

11. The display system of claim 10 wherein the first guide element which engages around the viewing screen on the outside is of sheet-shaped design and substantially conceals a rear side of the viewing screen in the non-functional position.

12. The display system of claim 1 wherein the viewing screen is arranged in a recess of the vehicle when in the non-functional position.

13. The display system of claim 1 wherein the first axis and the second axis are substantially horizontal.

14. A display system for a vehicle comprising:
    a viewing screen configured to rotate between a first position and a second position about a first pivot axis;
    at least one guide element configured for rotation about a second pivot axis and coupled to the viewing screen at the first pivot axis, wherein the first pivot axis of rotation is substantially parallel to the second pivot axis;

wherein the at least one guide element in the second position of the viewing screen can be brought into the same position relative to a trim panel as in the first position of the viewing screen.

15. The display system of claim 14 wherein the first position is a non-functional position and the second position is a functional position.

16. A display system of a vehicle interior comprising:
a viewing screen configured to rotate about a first axis between a first position and a second position;
a first guide element pivotable about a second axis and coupled to the viewing screen;
a second guide element pivotable about a third axis and coupled to the viewing screen;
wherein the second axis and the third axis are substantially parallel to the first axis.

17. The display system of claim 15 wherein the distance between the second axis and the third axis is enlarged when the viewing screen is rotated from the first position into the second position.

18. The display system of claim 16 wherein the first guide element is coupled to the viewing screen at the first axis and to the vehicle at the second axis, the second guide element is coupled to the vehicle at the third axis and to the viewing screen at a fourth axis, the first axis, second axis, third axis, and the fourth axis are substantially parallel to each other.

19. The display system of claim 18 wherein the distance between the first axis and the third axis and between the fourth axis of rotation and the second axis are enlarged when the viewing screen is swung up from the first position into the second position.

20. A display system for a vehicle comprising:
a viewing screen configured to rotate between a non-functional position into a functional position;
at least one guide element rotatable about a first axis and rotatably coupled to the viewing screen at the first pivot a second axis;
wherein the axes of rotation of the viewing screen and the at least one guide element first axis and the second axis are substantially parallel to each other;
wherein the at least one guide element in the functional position of the viewing screen can be brought into the same position resting on a trim panel as in the non-functional position of the viewing screen.

* * * * *